(12) United States Patent
Welland

(10) Patent No.: US 10,488,269 B2
(45) Date of Patent: Nov. 26, 2019

(54) TEMPERATURE MEASUREMENT CIRCUITRY AND METHOD

(71) Applicant: Silicon Laboratories Inc., Austin, TX (US)

(72) Inventor: David R Welland, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 641 days.

(21) Appl. No.: 14/983,419

(22) Filed: Dec. 29, 2015

(65) Prior Publication Data

US 2016/0131536 A1 May 12, 2016

Related U.S. Application Data

(63) Continuation of application No. 13/624,619, filed on Sep. 21, 2012, now Pat. No. 9,250,137.

(51) Int. Cl.
*G01K 7/00* (2006.01)
*G01K 7/01* (2006.01)
*G01K 7/34* (2006.01)

(52) U.S. Cl.
CPC .............. *G01K 7/01* (2013.01); *G01K 7/34* (2013.01); *G01K 2219/00* (2013.01)

(58) Field of Classification Search
USPC .................................................. 374/170, 178
See application file for complete search history.

(56) References Cited

U.S. PATENT DOCUMENTS

| | | |
|---|---|---|
| 7,429,129 B2 | 9/2008 | St. Pierre et al. |
| 7,637,658 B2 | 12/2009 | Gardner et al. |
| 2009/0009234 A1 | 1/2009 | St. Pierre et al. |
| 2009/0196322 A1 | 8/2009 | McCarthy et al. |
| 2011/0291807 A1 | 12/2011 | Law et al. |
| 2012/0087390 A1 | 4/2012 | Raychowdhury et al. |
| 2013/0060499 A1 | 3/2013 | Yoshimura |
| 2014/0241397 A1 | 8/2014 | Hashimoto |
| 2015/0369674 A1* | 12/2015 | Ma .................... G01K 7/015 374/1 |

* cited by examiner

*Primary Examiner* — Mirellys Jagan
(74) *Attorney, Agent, or Firm* — RM Reed Law PLLC

(57) ABSTRACT

A method includes alternately coupling a selected one of a plurality of current sources and two or more of the plurality of current sources to a first terminal of a bipolar device during first and second phases of a modulator cycle of a plurality of modulator cycles. The method further includes providing sampled voltages from the first terminal of the bipolar device to a modulator to produce a modulator output signal, filtering the modulator output signal to produce a filtered output signal using a back-end filter having an impulse response, and determining a temperature in response to the filtered output signal.

19 Claims, 3 Drawing Sheets

TEMPERATURE MEASUREMENT CIRCUITRY AND METHOD

CROSS-REFERENCE TO RELATED APPLICATION(S)

This application is a divisional of and claims priority to co-pending U.S. patent application Ser. No. 13/624,619 filed on Sep. 21, 2012 and entitled "Temperature Measurement Circuitry and Method," which is incorporated herein by reference in its entirety.

FIELD

The present disclosure is generally related to temperature measurement, and more particularly to temperature measurement circuits and methods of determining a temperature.

BACKGROUND

Integrated circuits can include temperature sensors for a variety of purposes including detecting excessive heating in order to shut down circuitry to prevent heat-related damage. For example, circuitry can be damaged by high temperatures, such as heat produced through power dissipation. In such circuits, it may be desirable to produce a signal when a circuit temperature exceeds a safe temperature limit to shut down the circuitry or to alter circuit operation to prevent damage from over-heating or thermal runaway.

Integrated circuits can measure temperature based on a voltage differential between diode-connected transistors, which produce temperature dependent voltages. To convert the voltage differential to a digital scale, some circuits attempt to digitize a ratio of the voltage differential and a temperature independent voltage. However, process variation may produce component mismatches, unintended offsets, and non-idealities (such as different emitter resistances across transistors), which may require trimming and calibration operations to produce the intended linearity across temperatures for a given amount of accuracy/resolution.

SUMMARY

In an embodiment, a method includes alternately coupling a selected one of a plurality of current sources and two or more of the plurality of current sources to a first terminal of a bipolar device during first and second phases of a modulator cycle of a plurality of modulator cycles. The method further includes providing sampled voltages from the first terminal of the bipolar device to a modulator to produce a modulator output signal, filtering the modulator output signal to produce a filtered output signal using a back-end filter having an impulse response, and determining a temperature in response to the filtered output signal.

In another embodiment, a temperature measurement circuit includes a modulator, a back-end filter, and a temperature determination circuit. The temperature measurement circuit includes an input terminal and an output terminal. The input terminal is configured to receive an input signal corresponding to a time-varying voltage at a first terminal of a bipolar device. The modulator is configured to provide a modulator output signal on the output terminal in response to receiving the input signal. The back-end filter is coupled to the output terminal and including a filter output terminal. The back-end filter is configured convolve the modulator output signal with an impulse response to provide a filtered signal to the filter output terminal. The temperature determination circuit is coupled to the filter output terminal and configured to determine a temperature in response to receiving the filtered signal.

In still another embodiment, a temperature measurement circuit includes a current source circuit, a bipolar device, a delta-sigma modulator, a back-end filter, a temperature determination circuit and a controller. The current source circuit includes an output terminal and includes a plurality of current sources that are independently controllable to provide a selected current to the output terminal. The bipolar device includes a first terminal coupled to the output terminal and is configured to produce a base-emitter voltage in response to the selected current. The delta-sigma modulator includes an input coupled to the first terminal of the bipolar device and includes an output configured to carry a plurality of one-bit values representative of a temperature. The back-end filter including an input coupled to the output of the delta-sigma modulator and including an output to provide a multi-bit output signal related to the plurality of one-bit values. The temperature determination circuit is coupled to the output of the back-end filter and configured to determine a temperature of the bipolar device based on the multi-bit output signal. The controller is configured to control the current source circuit to provide a time-varying current to the output terminal during a first plurality of modulator cycles of an input square wave period and to provide a substantially constant current to the output terminal during a second plurality of modulator cycles of the input square wave period.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
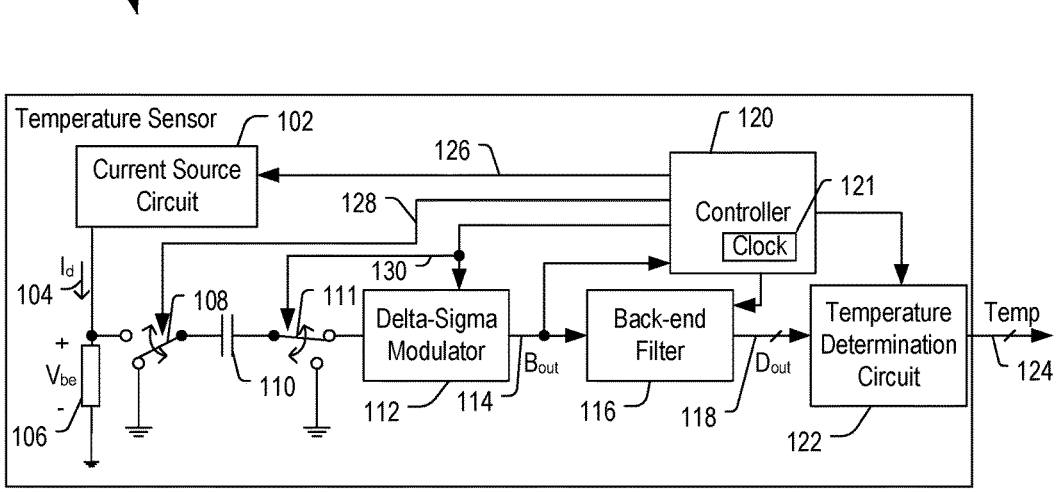
FIG. 1 is a block diagram of an embodiment of a temperature measurement circuitry.

Embodiments of a temperature measurement circuitry and methods are described below that include a current source circuit having multiple unit-current sources that can be controlled to alternately apply at least one first current and a second current to a first terminal of a bipolar device to produce base-emitter voltages that can be used to determine a differential base-emitter voltage. The first current can be provided by controlling the current source circuit to couple a selected one of the multiple unit-current sources to the first terminal. The second current can be provided by controlling the current source to couple a selected set (such as all) of the multiple unit-current sources to the first terminal. The base-emitter voltages can be sampled in response to the first and second currents to determine a temperature.

As discussed in greater detail below, in exemplary embodiments, the temperature measurement circuitry utilizes a single bipolar device (such as a diode or bipolar transistor), a single capacitor, and switches to reduce analog impairments (such as mismatches, offsets, etc.). Further, the number of calibrations can be reduced and the precise control and/or measurement of the test floor temperature during fabrication/testing can be avoided.

In the following discussion, a bipolar device is discussed. In some exemplary embodiments, the bipolar device may be implemented as a diode. In other exemplary embodiments, the bipolar device may be implemented using a bipolar transistor. One exemplary embodiment of such a device is a bipolar transistor having a diode-configuration (i.e., its collector is coupled or connected to its base). The diode characteristic of the diode-connected transistor need not vary linearly with temperature. Embodiments described below digitize the current-voltage (I-V) characteristic and determine the temperature based on the digitized I-V characteristic. In one embodiment, the temperature is determined using a polynomial algorithm or circuit that is configured to receive the digitized I-V characteristic and to determine (or derive from) the temperature in response thereto. In another embodiment, the temperature is determined using a lookup table. The temperature values within the lookup table can be populated after first silicon is measured, taking advantage of lot-to-lot repeatability of the temperature-dependent I-V characteristic of the diode-connected transistor.

Conventionally, diode-connected bipolar transistors can be used to determine a temperature by applying different currents to two different transistors and by measuring the base-emitter voltages to determine a differential voltage. To digitize the differential voltage ($\Delta V_{be}$), a reference voltage, typically a bandgap voltage ($V_{bg}$), is used according to the following equation.

$$\text{Ratio} = \frac{\Delta V_{be}}{V_{bg}} = \frac{\Delta V_{be}}{V_{be} + m * \Delta V_{be}} \quad (1)$$

In Equation 1, the digital result is expressed as a ratio of the differential base-emitter voltage ($\Delta V_{be}$) relative to the bandgap voltage ($V_{bg}$). The bandgap voltage ($V_{bg}$) is represented by an equation that includes a parameter (m) that is chosen to minimize or reduce the dependence of the bandgap voltage on the temperature. The differential base-emitter voltage can be expressed according to equation 2 below.

$$\Delta V_{be} = \frac{\frac{kT}{q}\ln J_1}{J_2} \quad (2)$$

In equation 2, variables $J_1$ and $J_2$ are the current densities of the bipolar transistors, k is the Boltzmann constant, T is the absolute temperature, and q is the charge of an electron.

Thus, the ratio varies linearly with temperature, because all of the other variables are constant. However, the presence of parameter (m) in Equation 1 is still a source of error.

Exemplary embodiments described below do not rely on the linearity of the temperature dependence of the ratio. Accordingly, the value of the parameter (m) may be set equal to zero, eliminating a source of error. Further, in addition to eliminating this source of error, the signal-to-noise ratio (SNR) is increased. In particular, since the base-emitter voltage has a negative temperature coefficient, elimination of the influence of parameter (m) increases the sensitivity of the ratio to temperature. Thus, for a given level of noise, the resultant temperature error is reduced. An example of a circuit configured to determine the temperature is described below with respect to FIG. 1.

FIG. 1 is a block diagram of an embodiment of a temperature measurement circuitry 100. Temperature measurement circuitry 100 could be implemented on an integrated circuit or as part of a larger system such as a system on a chip and the like. Temperature measurement circuitry 100 includes a current source circuit 102 configured to provide a current ($I_d$) 104 to a first terminal of a bipolar device, represented in FIG. 1 as a box identified by reference numeral 106, which has a second terminal coupled to a power supply terminal (ground). In exemplary embodiments, bipolar device 106 may be implemented as a diode having an anode coupled to current source circuit 102 and a cathode coupled to the power supply terminal. In other exemplary embodiments, bipolar device 106 may be implemented using a bipolar transistor. In the following discussion, bipolar device 106 refers to a diode-connected bipolar transistor implementation. However, other embodiments can include another type of bipolar device, such as a junction diode. In various forms, the bipolar device may be implemented in any one of various process technologies, including in a CMOS process, a bi-CMOS process or in a bipolar process.

The first terminal of bipolar device 106 is coupled to a first terminal of a switch 108, which has a second terminal coupled to a terminal of a capacitor 110. Switch 108 has a third terminal coupled to a power supply terminal, which may be at a supply voltage such as ground potential. Capacitor 110 has a second terminal coupled to a first terminal of a switch 111, which has a second terminal coupled to an input of a delta-sigma modulator 112, and a third terminal coupled to a power supply terminal, which may be ground. The power supply terminal coupled to switch 108 may be at a different voltage potential than the power supply terminal coupled to switch 111, depending on the implementation.

Delta-sigma modulator 112 includes an output 114 coupled to an input of a back-end filter 116. Back-end filter 116 has an output 118 coupled to an input of a temperature determination circuit 122. Current source circuit 102, switch 108, switch 111, delta-sigma modulator 112, back-end filter 116, and temperature determination circuit 120 have control inputs coupled to a controller 120 to receive control signals.

Controller 120 is configured to control current source circuit 102 via one or more current control signals 126 to provide a time-varying current ($I_d$ 104) to the first terminal of bipolar device 106, producing a time-varying base-emitter voltage ($V_{be}$) across the base-emitter junction of bipolar device 106, which in this exemplary embodiment is implemented using a bipolar transistor. Controller 120 also controls switch 108 via switch control signal 128 to provide the time-varying base-emitter voltage to capacitor 110. Controller 120 further controls switch 111 and delta-sigma modulator 112 via control signal 130 to provide a charge proportional to the time-varying base-emitter voltage to the input of delta-sigma modulator 112, dumping the charge from capacitor 110 into delta-sigma modulator 112 via control signal 130. In some embodiments, controller 120 includes a clock circuit 121, and control signal 130 may be a clock signal.

Delta-sigma modulator 112 produces a one-bit output signal ($B_{out}$) 114, which is provided to back-end filter 116. Back-end filter 116 produces a filtered multi-bit output signal $D_{out}$ 118, which is provided to temperature determination circuit 122, which is configured to determine a temperature value based on the filtered output signal $D_{out}$ 118 and to provide a multi-bit output signal labeled "Temp" corresponding to the temperature value. In some embodiments, temperature determination circuit 122 includes a programmable, polynomial machine configured to receive the filtered output signal $D_{out}$ 118 and to calculate the temperature based on the signal. In a particular example, the polynomial machine processes the filtered output signal $D_{out}$ 118 based on the pre-programmed coefficients of the polynomial. In other exemplary embodiments, temperature determination circuit 122 includes a lookup table configured with a plurality of temperature values and is configured to determine the temperature from the lookup table based on the filtered output signal $D_{out}$ 118. In the above examples involving the polynomial or the table, temperature determination circuit 122 renders moot the non-linear nature of the ratio as a function of the temperature.

In some embodiments, controller 120 controls current source circuit 102 by using signal 126 to selectively couple one or more of a plurality of unit current sources from current source circuit 102 to the first terminal of bipolar device 106. The unit current sources provide substantially the same currents, but the unit currents may vary slightly due to non-idealities. When controller 120 controls current source circuit 102 to couple a selected one of the plurality of unit current sources to the first terminal of bipolar device 106, a relatively low current is provided, producing a relatively low base-emitter voltage ($V_1$). When controller 120 controls current source circuit 102 to couple all of the plurality of unit current sources to the first terminal of bipolar device 106 at the same time, a relatively high current is provided, producing a relatively high base-emitter voltage ($V_2$).

In operation, controller 120 controls the plurality of unit current sources of current source circuit 102 alternately to couple at least some of the plurality of unit current sources to the first terminal to provide the relatively high current and to couple a selected one of the plurality of unit current sources to the first terminal to provide the relatively low current to the first terminal. In each modulator cycle, controller 120 controls current source circuit 102 to provide the relatively low current in a first phase and to provide the relatively high current in a second phase. The terms "first" and "second" in this discussion are not intended to imply a particular order, but rather to distinguish between the phases. During the first phase, controller 120 selects one of the plurality of unit current sources, cycling through the unit current sources from modulator cycle to modulator cycle by rotating through the multiple unit current sources.

Due to mismatches, individual ones of the plurality of unit current sources may provide a current level that differs from that of other unit current sources. However, the variations can be averaged to provide a unit current values that is 1/Nth of the (N) unit current sources.

In an exemplary embodiment, the current source circuit 102 includes sixteen unit current sources, and controller 120 controls the unit current sources to provide a ratio of 16 to 1 between the relatively high current level and the relatively low current level, resulting in a relatively high base-emitter voltage ($V_2$) and a relatively low base-emitter voltage ($V_1$), respectively. By rotating through the sixteen unit current sources (i.e., successively activating different ones of unit current sources), the relatively low current level may have sixteen slightly varied current levels due to mismatches. In the presence of this kind of mismatch, the effects may be averaged to provide relatively low current that is approximately $\frac{1}{16}^{th}$ of the relatively high current. Using a single bipolar device 106 and varying the diode current ($I_d$) 104 in this manner provides a temperature dependent differential voltage that can be used to determine a temperature while eliminating diode mismatch errors.

The time-varying current mimics switching between two diodes having different base-emitter voltages. Controller 120 controls switch 108 to selectively couple the first terminal of capacitor 110 to the first terminal of bipolar device 106 or to ground, and controls switch 111 to selectively couple the second terminal of capacitor 110 to ground or to the input of modulator 112. In particular, controller 120 controls switch 108 based on the output $B_{out}$ 114 of the delta-sigma modulator 112. In some embodiments, controller 120 may be a state machine, although generally any suitable circuit that provides sequential logic functionality may be used, as persons of ordinary skill in the art understand. One possible example of switching states of capacitor 110 is described below in Table 1. For the example of Table 1, current source circuit 102 includes 16 unit current sources that are independently controllable to supply a selected one of the unit currents ($I_i$ during phase 1) or all of the unit currents ($I_{1-16}$ during phase 2) to the first terminal of bipolar device 106.

TABLE 1

Switching States of Switched Capacitor 110 during a modulator cycle.
Switching States during each modulator cycle

| | Phase 1 | Phase 2 |
|---|---|---|
| Unit Current Source(s) | $I_i$ of 16 unit currents (I) | Total Unit Currents ($I_{1-16}$) |
| Switch 111 | Ground | Provide Capacitor Charge to Modulator |
| Switch 108 | $V_1$ | If Bout 114 = 0, then V2<br>If Bout 114 = 1, then ground |

As shown in Table 1, during a first phase (or first portion) of the modulator cycle, controller 120 controls current source circuit 102 to provide a single unit current ($I_i$) from a selected one of the unit current sources to the first terminal of bipolar device 106. Controller 120 controls switch 111 to couple to ground and controls switch 108 to couple to the first terminal of bipolar device 106. During the second phase of the modulator cycle, controller 120 controls current source circuit 102 to provide all of the unit currents ($I_{1-16}$) to the first terminal of bipolar device 106. Controller 120 also controls switch 111 to couple to the input of modulator 112 to provide the charge from capacitor 110 into modulator 112. During this phase, controller 120 controls switch 108 to remain coupled to the first terminal of diode 118 to receive the second voltage ($V_2$) if the output of the modulator 112 from the previous modulator cycle was a zero (0). If the output of modulator 112 was a one (1) from the previous modulator cycle, controller 120 controls switch 108 to couple to ground.

In the next modulator cycle, during the first phase, controller 120 selects a next one of the unit current sources and provides the associated unit current ($I_i$) to the first terminal of bipolar device 106. During the second phase, controller 120 controls current source circuit 102 to provide all of the unit currents to the first terminal of bipolar device 106. These phases are repeated for each modulator cycle.

Over time, the delta-sigma modulator 112 operates to balance the charge and the back-end filter 116 operates to average the one-bit outputs ($B_{out}$) to obtain the output ($D_{out}$) such that the output averages to approximately zero as shown in the following equation.

$$(V_1 - V_2)(1-D) + DV_1 = 0 \quad (3)$$

where (D) is the long-term average of the one-bit outputs ($B_{out}$) from the back-end filter 116. Equation 3 can be rewritten as shown in the following equation.

$$V_1 = V_2(1-D) \quad (4)$$

Solving for the long-term average (D), equation 4 can be rewritten as shown in the following equation.

$$D = \frac{V_2 - V_1}{V_2} \quad (5)$$

As discussed above, the variations in the unit currents due to mismatches cause variations in the resulting base-emitter voltages at the relatively low voltage level. However, such variations are averaged by the back-end filter 116 to provide the equivalent of a current ratio of 1 to 16, assuming 16 current sources are used. The ratio could be a different ratio if a subset of the unit current sources is used (such as 8 of the 16 unit current sources) or if a larger number of unit current sources are used.

In the discussion above, current source circuit 102 is depicted as being connected to the first terminal of bipolar device 106. In some instances, current source circuit 102 may be coupled to the cathode of bipolar device 106 instead, and the first terminal may be coupled to a power supply terminal.

In general, to mimic operation of two diodes having different currents, controller 120 controls current source circuit 102 to provide a time-varying current ($I_d(t)$) to a first terminal of bipolar device 106. An exemplary embodiment of a portion of a current source circuit 102 that is controllable to provide a time-varying current is described below with respect to FIG. 2.

Figure 2:
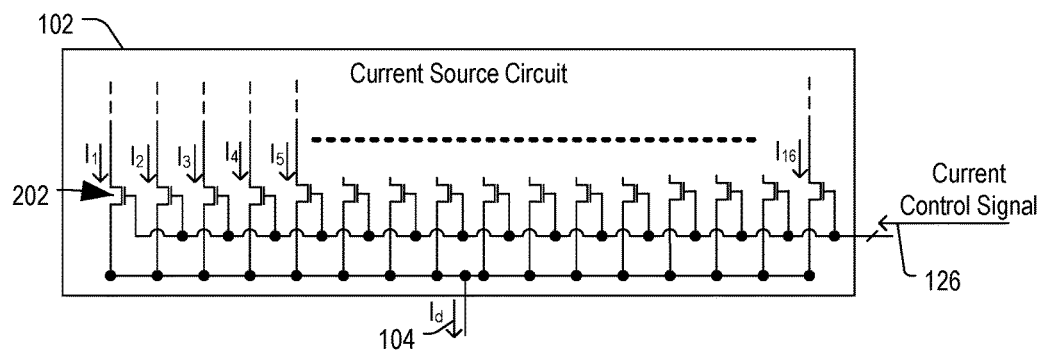
FIG. 2 is a circuit diagram of an embodiment of a portion of a current source circuit that is configured to selectively supply one or more of a plurality of currents to a terminal of a bipolar device.

FIG. 2 is a circuit diagram of an embodiment of a portion of current source circuit 102 of FIG. 1 that is configured to selectively couple one or more of a plurality of currents to the first terminal of bipolar device 106. In this example, current source circuit 102 includes a plurality of transistors generally indicated at 202. Each transistor has a source coupled to a current source, a gate coupled to controller 120, and a drain coupled to the first terminal of bipolar device 106. Each transistor has an associated current ($I_1$, $I_2$, $I_3$, $I_4$, $I_5$, ..., or $I_{16}$), which can be selectively coupled to the first terminal of bipolar device 106 in response to current control signal(s) 126. While the connection between controller 120 and current source circuit 102 in FIG. 1 is shown as a single line, multiple independent connections may be used. In particular, each transistor 202 can be independently controlled, allowing controller 120 to control current source circuit 102 to selectively supply one or more of the currents to the first terminal of bipolar device 106. In the embodiment shown, 16 current sources are used, although other numbers of current sources may be used by making appropriate modifications, as persons of ordinary skill in the art understand.

In an example, in a first phase, controller 120 provides current control signals 126 to bias a selected one of the transistors 202 to provide one of the unit currents ($I_1$, $I_2$, ..., $I_{16}$). In the second phase, controller 120 provides current control signals 126 to bias all of the transistors 202 to provide all of the unit currents to the first terminal of bipolar device 106. Over a sequence of modulator cycles, controller 120 selectively activates a selected one of the transistors 202 during a first phase to provide a selected unit current (one of $I_1$, $I_2$, $I_3$, ..., $I_{16}$) and some or all of the transistors 202 during a second phase to provide a total current ($I_{1-16}$). Over time, the current provided to the first terminal is time-varying (e.g., $I_1$, $I_{1-16}$, $I_2$, $I_{1-16}$, ...). From modulator cycle to modulator cycle, controller 120 rotates through the drain currents (or collector currents if implemented using bipolar transistors), selectively activating a different one of the transistors 202 during the respective first phases of each modulator cycle as depicted below with respect to FIG. 3.

Figure 3:
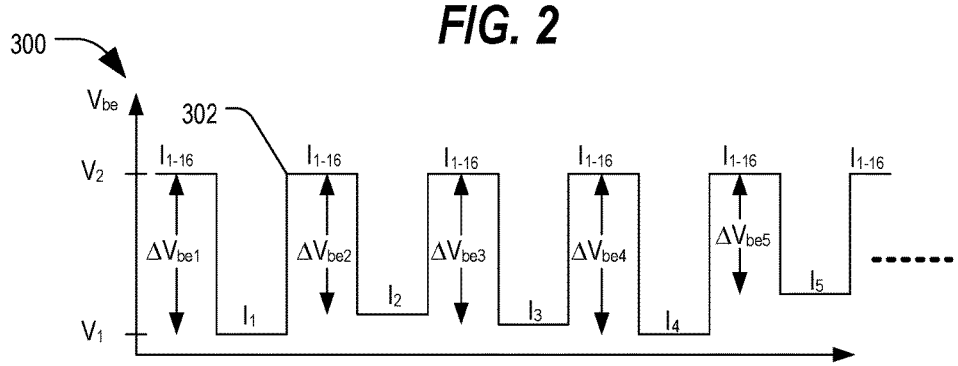
FIG. 3 is a diagram of an exemplary embodiment of a voltage caused by a time-varying current from the current source circuit of FIG. 2.

FIG. 3 is a diagram 300 of an example of a time-varying voltage 302 caused by a time-varying current 104 from current source circuit 102 of FIGS. 1 and 2. During a first phase, a selected one of transistors 202 is biased to conduct current (I) and during a second phase, a set (such as all) of transistors 202 is biased to conduct current (such as $I_{1-16}$). In this example, unit currents $I_1$ and $I_4$ are approximately equal, and unit currents $I_2$, $I_3$, and $I_5$ differ from currents $I_1$ and $I_4$ and from each other. As shown, as the current supplied to the diode ($I_d$) varies between the relatively high current and the relatively low current, the corresponding base-emitter voltage oscillates between a relatively high base-emitter voltage ($V_2$) and a low base-emitter voltage ($V_1$). The low base-emitter voltage ($V_1$) varies based on the selected current source, which variations may be caused by mismatches. By switching between the single unit current and all (or a subset) of the unit currents, differential base-emitter voltages ($\Delta V_{be}$) are generated. In this example, the base-emitter voltages are slightly different; however, they can be averaged by back-end filter 116 over time to provide an average differential base-emitter voltage.

While the above examples describe alternating between a unit current and a plurality of unit currents applied to the first terminal of bipolar device 106, DC impairments, such as amplifier offsets, charge injection, and 1/f noise (for example), can still provide some problems. However, temperature measurement circuitry 100 can avoid the DC impairments by making the differential base-emitter voltage vary periodically. In this exemplary embodiment, the back-end filter 116 can then be implemented as a band-pass filter, rather than low-pass filter, thus eliminating DC impairments. In this particular example, in a first plurality of modulator cycles, the front-end operates as described above. In a second plurality of modulator cycles, the total current ($I_{1-16}$) is provided to the bipolar device 106 during both phases of each modulator cycle. This effectively converts the value of the differential base-emitter voltage into a square wave over the two pluralities of modulator cycles.

In general, the input square wave period includes a plurality of modulator cycles including a first plurality of modulator cycles and a second plurality of modulator cycles. In the first plurality of modulator cycles, the current supplied to bipolar device 106 varies between a single unit current ($I_t$) in a first phase and a total unit current ($I_{1-16}$) in a second phase. In the second plurality of modulator cycles, the current supplied to bipolar device 106 does not vary between the first phase and the second phase of each modulator cycle. In a particular example, the current supplied to bipolar device 106 is the total unit current ($I_{1-16}$) for both phases for each of the second plurality of modulator cycles.

Referring again to Equation 5 above, during the first plurality of modulator cycles, the digital output is the ratio of the difference between the voltage ($V_2$) when the total unit current ($I_{1-16}$) is provided to bipolar device 106 and the voltage ($V_1$) when a selected unit current ($I_t$) is provided to bipolar device 106 divided by the voltage ($V_2$). During the first plurality of modulator cycles, the digital output is a ratio value that is not equal to zero. During the second plurality of modulator cycles, the difference between the voltage ($V_1$) and the voltage ($V_2$) is zero, because the total unit current ($I_{1-16}$) is supplied to bipolar device 106 during both phases of each modulator cycle. Thus, the delta-sigma modulator 112 operates to convert the voltage from bipolar device 106 into a square wave.

In some exemplary embodiments, the input square wave period is 256 modulator cycles, the first plurality of modulator cycles includes 128 modulator cycles, and the second plurality of modulator cycles includes 128 modulator cycles. In other examples, the input square wave period may include fewer modulator cycles or more modulator cycles. In general, the number of modulator cycles may be determined by the specifics of a particular implementation, such as the size of memory needed to store the digital values of the impulse response of the back-end filter 116 as will be described below. Additionally, a measurement period or measurement taken by temperature measurement circuitry 100 may include multiple input square wave periods. In an example, the number of input square wave periods may be programmable, such as by setting a value in a register or memory (not shown). An increased number of sampling periods increases the power consumption but also improves the signal-to-noise ratio. In an example, three input square wave periods may be used to determine the temperature.

In an example, the delta-sigma modulator 112 can be implemented as having a band-pass characteristic. However, a band-pass response may produce an output signal having DC effects, quantization noise, and other noise (such as thermal noise) that can be removed by back-end filter 116. In some exemplary embodiments, the back-end filter 116 may be implemented to convolve the output of modulator 112 with a sine wave to filter the noise. However, an abrupt start and stop of the sine wave increases quantization noise. Accordingly, the sine wave is windowed at the beginning and end to soften the transitions, reducing quantization noise. One possible example of a back-end filter configured to remove such noise is described below with respect to FIG. 4.

Figure 4:
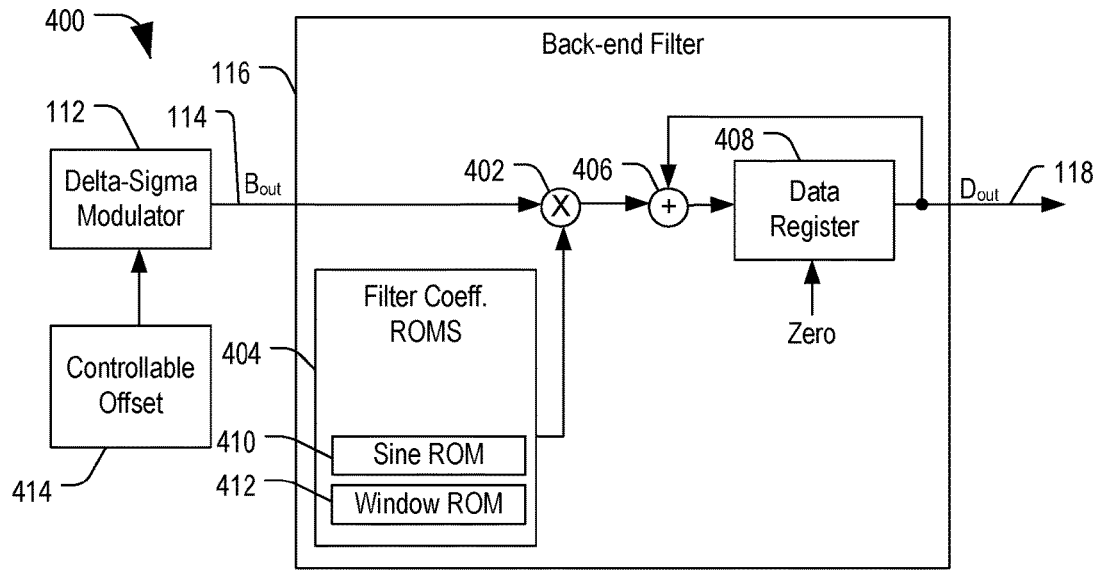
FIG. 4 is a block diagram of a portion of the temperature measurement circuitry of FIG. 1 including a back-end filter.

FIG. 4 is a block diagram of a portion 400 of the temperature measurement circuit 102 of FIG. 1 including back-end filter 116. Back-end filter 116 includes an input terminal coupled to an output terminal of delta-sigma modulator 112 to receive the modulator output signal ($B_{out}$) 114. Back-end filter 116 includes a multiplier 402 having a first terminal coupled to the input, a second terminal coupled to filter coefficient ROMs 404 (or generally other suitable storage device or circuit, as persons of ordinary skill in the art understand), and an output terminal coupled to an input terminal of an adder 406. Adder 406 includes a second input terminal for receiving data output signal ($D_{out}$) 118 and an output terminal coupled to an input terminal of a data register 408, including an input terminal for receiving a zero signal and an output terminal for providing data output signal ($D_{out}$) 118. Filter coefficient ROMS 404 include sine ROM (SROM) 410 configured to store bit values corresponding to a first quadrant of a sine wave and a windowing ROM (WROM) 412 configured to store bit values corresponding to a windowed version of the sine wave. Since the modulator output ($B_{out}$) is a single bit value, the multiplication operation is trivial. Further, only one filter output sample is used to report the temperature, so no memory other than that in data register 408 is used. In exemplary embodiments, rather than using ROMS, other suitable storage circuits or devices may be used, for example, flash memory, EEPROM, etc., as persons of ordinary skill in the art understand. By using re-writable storage devices, the characteristics of the back-end filter 116 may be changed or programmed, as desired, for example, by the user of the device.

In an example, portion 400 includes a controllable offset source 414. Controller 120 can cause controllable offset source 414 to intentionally introduce an offset by injecting a fixed amount of charge into delta-sigma modulator 112 with each cycle. In some exemplary embodiments, the offset voltage may be intentionally introduced, for example, to center the AC waveform of the transfer function of delta-sigma modulator 112 (for example, away from extremes). While controllable offset source 414 is depicted as providing an offset signal directly to delta-sigma modulator 112, in some implementations, controllable offset source 414 may provide the offset charge directly to the input coupled to the second terminal of switch 111 in FIG. 1.

In general, an idealized filter may enhance the signal-to-noise ratio (SNR), depending on the type of input noise (e.g., quantization noise, thermal noise, etc.). In exemplary embodiments, back-end filter 116 may be designed to represent a compromise between a filter optimized for suppression of quantization noise and a filter optimized for suppression of thermal noise. Since quantization noise can be suppressed by increasing an oversampling ratio of delta-sigma modulator 112, back-end filter 116 may be slanted toward filtering of thermal noise. Such a filter may be called a "matched filter." In such a scenario, symbols or signal values are transmitted in the presence of noise, and a matched filter has an impulse response that is the time reversal of the transmitted symbols in order to maximize SNR in the presence of white noise, such as thermal noise. The output of the filter can be obtained by convolving the input signal with the filter impulse response. In this example, the filter output is maximized at the time when the time-reversed impulse response aligns with the symbol itself.

With a matched filter, the convolution multiplies the signal by a larger number when the signal is large and by a small number when the signal is small (thereby multiplying noise by a small number). In this example, the symbol is a square wave of alternating values of the base-emitter voltage ($\Delta V_{be}$) and of zeros, so a matched back-end filter would have a square-wave impulse response. However, while a matched filter would be optimal in the presence of white noise alone, the matched filter's response to quantization noise may be unacceptable. In particular, square wave harmonics and the finite duration (abrupt beginning and ending) of the time-varying base-emitter voltage signal can lead to relatively poor suppression of quantization noise. A compromise filter can be obtained by passing the fundamental frequency of the input square wave, which contains approximately 81% of the square-wave energy and by windowing the response to smooth start and stop transients, as noted above.

The non-windowed impulse response of the back-end filter 116 is then simply a sine wave. In some embodiments, one quadrant of the sine wave is stored in SROM 410. The other quadrants of the sine wave may be created by time-reversing and/or inverting the readout order of the SROM data words. The first period of the sine wave is softened (windowed) by multiplying the non-windowed values by a raised cosine. These modified (softened) values are stored in WROM 412. WROM 412 can have four times the size or more of the SROM 410 because, instead of storing the one quadrant of the sine wave, the WROM 412 may be sized to store at least four quadrants of the windowed sine wave. The windowed and non-windowed portions of the impulse response can be combined to provide an impulse response.

In some exemplary embodiments, temperature measurement circuitry 100 operates at a clock frequency of approximately 1 MHz. The square wave signal represented by the time-varying base-emitter voltage ($\Delta V_{be}$) can be sampled any number of times. In an example, the controller 120 may be configured to control back-end filter 116, current source circuit 102, and switches 108 and 111 to sample the voltages a programmable number of times. In an example, the number of square waves to be sampled can be selected to be between 3 and 257, in the latter case using an impulse response of 255 sine wave periods plus two periods that are windowed sine waves (one at the beginning and one at the end). In general, the measurement period of the modulator 112 may include any number of modulator cycles. Back-end filter 116 may apply any (programmable) number of periods of a sine wave to filter the data sample. Using more sine wave periods results in increased power consumption but also enhanced SNR.

In an example, the overall response of back-end filter starts with the values stored in WROM 412. After the values are read out of the WROM 412, the values are read out of SROM 410. In some exemplary embodiments, the values are read out of the SROM 410 in a first order, then read out again in a second order, the read out a third time in the first order and inverted, and finally read out again in the second order and inverted to produce a sine wave. The duration of the impulse response of back-end filter 116 is selectable. A longer duration improves the signal-to-noise ratio. The SROM 410 is read continuously, cycle-after-cycle, as long as desired (based on the selected duration). The WROM 412 is finally read to end the response, this time in reverse order and with its data inverted. An example of the impulse response and the resulting frequency response are described below with respect to FIGS. 5A and 5B.

Figure 5A:
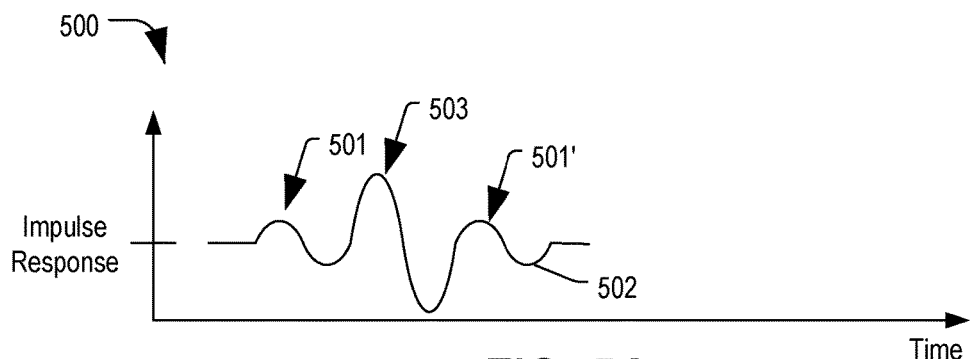
FIG. 5A is a diagram of an impulse response over time stored in a read-only memory (ROM) of a back-end filter of the temperature measurement circuitry of FIGS. 1-4.

FIG. 5A is a diagram 500 of an impulse response signal over time stored in a ROM of a back-end filter of the temperature measurement circuitry of FIGS. 1-4. The impulse response 502 has a windowed portion 501, which is read from WROM 412, and a non-windowed portion 503, which is read from SROM 410, followed by a second windowed portion 501', which is the reverse of the windowed portion 501. In this example, a duration of one sine wave is programmed, providing one full sine wave (non-windowed portion 503) and two windowed portions 501 and 501'. By windowing the sine wave at the beginning and the end, quantization noise effects are reduced relative to a sine wave with abrupt starts and stops.

Figure 5B:
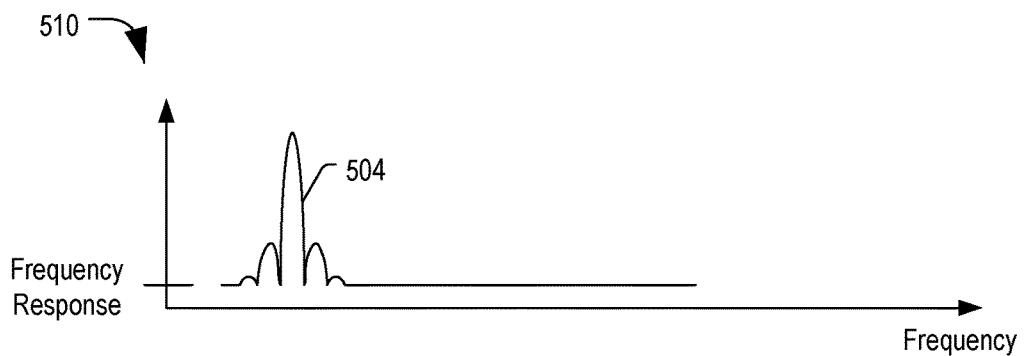
FIG. 5B is a diagram of a frequency-domain representation of the impulse response of the back-end filter of FIG. 5A.

FIG. 5B is a diagram of a frequency response 510 corresponding to? to the impulse response 500 of the back-end filter 116 of FIG. 5A. Frequency response 510 has a peak 504 at a fundamental frequency and quickly falls off with limited energy at harmonics of the fundamental frequency.

Figure 6:
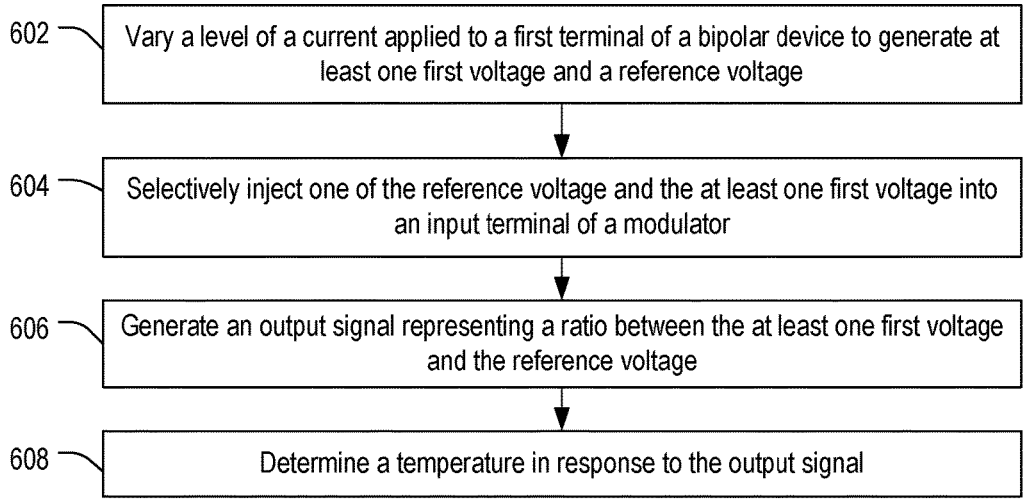
FIG. 6 is a flow diagram of an embodiment of a method of determining a temperature using the temperature measurement circuitry of FIG. 1.

FIG. 6 is a flow diagram of an embodiment of a method 600 of determining a temperature using the temperature measurement circuitry of FIG. 1. At 602, a level of a current applied to a first terminal of a bipolar device is varied to generate a reference voltage and at least one second voltage. In an exemplary embodiment, the current level is varied by alternately coupling a plurality of current sources and a selected one of the plurality of current sources to the first terminal to produce the reference voltage and the least one second voltage, respectively. The plurality of current sources may be unit current sources. In exemplary embodiments, when all of the plurality of current sources are activated, a relatively high reference current is provided to first terminal of the bipolar device, such as the first terminal of bipolar device 106, producing a correspondingly high diode voltage. When one of the current sources is activated and the rest turned off, a relatively low current is provided, producing a correspondingly low base-emitter voltage. In this particular example, the method 600 further includes alternating between the relatively high current and the relatively low current, successively activating the unit current sources to produce the at least one second voltage.

Advancing to 604, one of the reference voltage and the at least one second voltage are selectively injected into an input of a modulator. In some exemplary embodiments, a capacitor could be used to couple the modulator input to the first terminal of the bipolar device. In exemplary embodiments, the reference voltage and the at least one second voltage are selectively injected into the modulator through a capacitor, which includes a first terminal coupled to the first terminal of the bipolar device through a first switch and a second terminal coupled to the input of the modulator through a second switch. Continuing to 606, an output signal is generated that represents a ratio between the first voltage and the at least one second voltage. In an exemplary embodiment, the modulator, which is a delta-sigma modulator, generates the output signal by providing a one-bit output representing one of the one or more ratios to a back-end filter, which includes an accumulator. The one-bit output is convolved with an impulse response signal at the accumulator (back-end filter 116) to produce a resulting value, and the resulting value is provided to a temperature determination circuit 122 to determine a temperature. Convolving the one-bit output with an impulse response includes retrieving stored values from at least one memory to produce a sine wave representing the impulse response feedback signal. In some exemplary embodiments, retrieving stored values includes retrieving first values of the sine wave from a first memory (first windowed portion), retrieving second values of the sine wave from a second memory iteratively for a pre-determined period of time (non-windowed, sine wave portion), and retrieving the first values (windowed portion) of the sine wave from the first memory in reverse order and inverted to produce an impulse response.

Proceeding to 608, a temperature is determined in response to the output signal. In exemplary embodiments, temperature determination circuit 122 determines the temperature based on the output of the back-end filter 116. In one embodiment, temperature detection circuit 122 is a polynomial machine configured to calculate the temperature based on the output of the back-end filter 116. In another embodiment, temperature detection circuit 122 includes a lookup table that is pre-populated with temperature values that can be retrieved based on the output of the back-end filter to determine the temperature. In a particular example, the temperature lookup table 122 may be populated with temperature values based on temperature lab measurements of first silicon.

In some embodiments, temperature determination circuit 122 may be a programmable polynomial machine configured to calculate a temperature based on the output of the back-end filter 116. In exemplary embodiments, the coefficients for the polynomial used by temperature determination circuit 122 may be programmed based on a calibration process and/or based on measurements of first silicon at manufacturing.

In an alternative embodiment, the temperature determination circuit 122 may include lookup logic and a lookup table configured to retrieve a temperature value in response to the signal from the back-end filter 116. If the repeatability of the differential base-emitter voltage (ΔVbe) is sufficiently robust, no test floor temperature control or measurement will be needed, depending on the desired specifications for a particular implementation. In some exemplary embodiments, an external high-accuracy digital volt meter (DVM) can be used to measure the base-emitter voltage (Vbe), which may be in error before calibration. A high signal-to-noise ratio (SNR) digital output can be obtained indicating the ratio of the differential base-emitter voltage (ΔVbe) to the base-emitter voltage (Vbe). The value of the differential base-emitter voltage can then be derived, which value indicates the temperature as described above with respect to equation 2. The correct value of the base-emitter voltage at each temperature is known a priori from measurements taken from a first batch of fabricated integrated circuits (ICs) (i.e., first silicon). An adjustment to the reference current can thus be made to obtain the correct base-emitter voltage for the temperature. If the differential base-emitter voltage is sufficiently robust within a particular lot of fabricated ICs, but not between lots, it may be possible to obtain the differential base-emitter voltage versus temperature characteristic on a lot-to-lot basis.

In the above discussion, the terms "first" and "second" are used to differentiate between different voltages or currents; however, the terms do not necessarily imply timing. In the example of block 602 in FIG. 6, the at least one second voltage may be produced during a first phase of a modulator cycle while the first voltage may be produced during a second phase of the modulator cycle.

Figure 7:
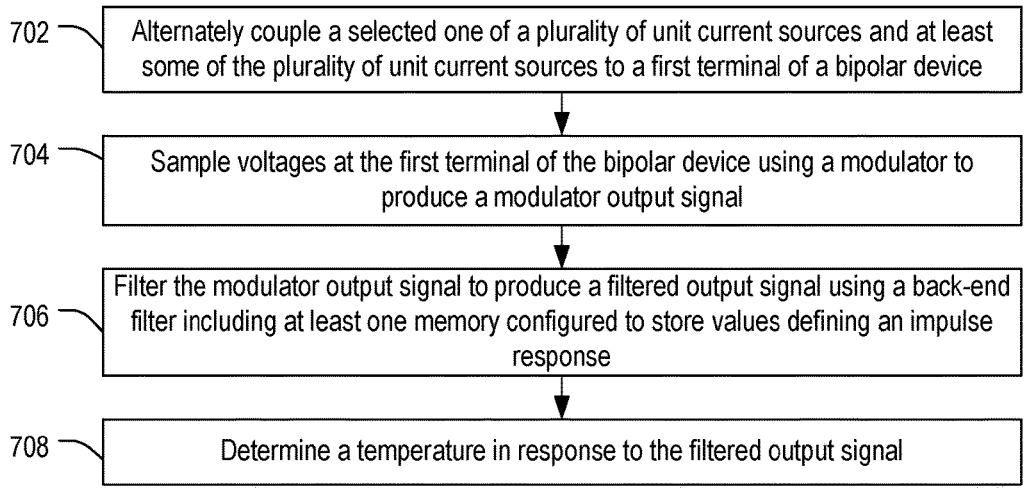
FIG. 7 is a flow diagram of a second embodiment of a method of determining a temperature using the temperature measurement circuitry of FIG. 1.

FIG. 7 is a flow diagram of a second embodiment of a method 700 of determining a temperature using the temperature measurement circuitry of FIG. 1. At 702, controller 120 of temperature measurement circuitry 100 controls a current source circuit 102 to alternately couple a selected one of a plurality of current sources and at least some of the plurality of current sources to a first terminal of a bipolar device, such as bipolar device 106. In exemplary embodiments, the plurality of current sources are unit current sources. In some exemplary embodiments, the controller alternately couples the selected one of the plurality of unit current sources and the some of the plurality of unit current sources to the first terminal in different phases of a modulator cycle. In a first phase, the controller selects one of the plurality of unit current sources and couples the selected one of the plurality of unit current sources to the first terminal to produce a first voltage. In a second phase, the controller couples a set of the plurality of unit current sources to the first terminal to produce a second voltage. The set may include all of the unit current sources. The method further includes iteratively repeating the first and second phases during at least a portion of a sampling period including a plurality of modulator cycles.

Advancing to 704, a modulator 112 samples voltages at the first terminal of the bipolar device to produce a modulator output signal. In exemplary embodiments, sampling the voltages includes controlling a first switch to couple a terminal of a capacitor to ground during a charge capture phase and to couple the terminal to an input of the modulator during a sample phase. Further, sampling the voltages includes controlling a second switch to couple a second terminal of the capacitor to the first terminal of the diode during the capture phase and to selectively couple the second terminal to one of ground and the first terminal during the sample phase based on a value of the modulator output signal. In exemplary embodiments, when the value of the modulator output signal is zero, the second terminal of the capacitor is coupled to the first terminal and, when the value of the modulator output signal is one, the second terminal of the capacitor is coupled to ground.

Continuing to 706, the modulator output signal is filtered to produce a filtered output signal using a back-end filter including at least one memory configured to store values defining an impulse response. The impulse response includes a periodic signal having a first windowed portion, a non-windowed portion, and a second windowed portion. In exemplary embodiments, the modulator output signal is filtered by convolving the modulator output signal with the impulse response to produce the filtered output signal. Such convolution can include reading a first set of values from a memory in a first order to form the first windowed portion, reading a second set of values from the memory in the first order to form a first quadrant of a sine wave of the non-windowed portion, and selectively reversing and inverting the second set of values to form second, third, and fourth quadrants of the sine wave. Further the convolution may include reversing the first order of the first set of values and inverting the first set of values to form the second windowed portion.

Proceeding to 708, a temperature is determined in response to the filtered output signal. In some exemplary embodiments, the temperature is determined by calculating the temperature by processing values from the filtered output signal using a polynomial machine. In another example, the temperature is determined by retrieving a temperature from a lookup table based on at least one value of the filtered output signal.

In conjunction with the circuits and methods described above with respect to FIGS. 1-7, a bipolar device is provided that alternately applies at least one first current and a second current (comprised of multiple unit currents) to a first terminal of a bipolar device to produce a differential base-emitter voltage. A controller controls a plurality of current sources to selectively couple a selected one of the current sources to the first terminal, rotating through the current sources, one at a time, during a first phase of a modulator cycle to produce a relatively low current and a resulting low base-emitter voltage. The controller controls the plurality of current sources to couple multiple ones (such as all) of the current sources to the first terminal during a second phase of the modulator cycle. The controller alternates between one and all of the current sources to provide a time-varying current and a corresponding time-varying base-emitter voltage, which can be sampled to determine a differential base-emitter voltage that can be used to determine a temperature. In some exemplary embodiments, the base-emitter voltages can be sampled using a delta-sigma modulator, which produces an output signal that is provided to a back-end filter having a programmable impulse response that is used to filter the output signal. The filtered output signal is provided to temperature determination circuit 122 configured to determine a temperature.

Although the present invention has been described with reference to preferred embodiments, workers skilled in the art will recognize that changes may be made in form and detail without departing from the scope of the invention.

What is claimed is:

1. A method comprising:
   controlling a current source circuit including a plurality of current sources to alternately couple a selected one of the plurality of current sources and two or more of the plurality of current sources to a first input of a bipolar device during first and second phases of a modulator cycle of a plurality of modulator cycles;
   sampling voltages from the first input of the bipolar device using a sampling circuit;
   providing sampled voltages from the sampling circuit to an input of a modulator configured to produce a modulator output signal based on the sampled voltages;
   filtering the modulator output signal to produce a filtered output signal using a back-end filter having a programmable impulse response; and
   determining, using a temperature determination circuit, a temperature in response to the filtered output signal.

2. The method of claim 1, wherein the plurality of current sources comprise unit current sources.

3. The method of claim 1, wherein the bipolar device comprises at least one of a diode and a bipolar transistor.

4. The method of claim 1, wherein determining the temperature comprises calculating the temperature by processing values from the filtered output signal using a polynomial machine of the temperature determination circuit.

5. The method of claim 1, wherein determining the temperature comprises retrieving, using the temperature determination circuit, a temperature from a lookup table based on at least one value of the filtered output signal.

6. The method of claim 1, wherein filtering the modulator output signal comprises convolving the modulator output signal with the impulse response using the back-end filter to produce the filtered output signal.

7. The method of claim 1, wherein the programmable impulse response comprises a plurality of values stored in at least one memory configured to define a periodic signal including a first windowed portion, a non-windowed portion, and a second windowed portion.

8. The method of claim 7, wherein determining the temperature comprises:
   reading a first set of values from the at least one memory in a first order to form the first windowed portion;
   reading a second set of values from the at least one memory in the first order to form a first quadrant of a sine wave of the non-windowed portion;
   selectively reversing and inverting the second set of values to form second, third, and fourth quadrants of the sine wave; and
   reversing the first order of the first set of values and inverting the first set of values to form the second windowed portion.

9. The method of claim 1, wherein providing the sampled voltages from the first terminal of the bipolar device comprises:
   controlling a first switch to couple a first input of a capacitor to a power supply terminal during a charge capture phase and to couple the first input to an input of the modulator during a sample phase; and
   controlling a second switch to couple a second input of the capacitor to an input of the bipolar device during the charge capture phase and to selectively couple the second terminal to one of a second power supply terminal and the input of the bipolar device during the sample phase based on a value of the modulator output signal.

10. The method of claim 9, wherein controlling the second switch to selectively couple the second input comprises:
    coupling the second terminal of the capacitor to the first terminal of the bipolar device when the value of the modulator output signal is zero; and
    coupling the second terminal of the capacitor to the second power supply terminal when the value of the modulator output signal is one.

11. The method of claim 1, wherein determining the temperature is performed during a measurement period including at least one input square wave period spanning a first plurality of modulator cycles and a second plurality of modulator cycles.

12. The method of claim 11, wherein alternately coupling the selected one of the plurality of current sources and the two or more of the plurality of current sources to the first terminal of the bipolar device comprises:
    in a first phase of a modulator cycle:
      selecting one of the plurality of current sources; and
      coupling a selected one of the plurality of current sources to the first terminal to produce a first voltage; and
    in a second phase of the modulator cycle:
      coupling the two or more of the plurality of current sources to the first terminal to produce a second voltage; and
      iteratively repeating the first and second phases during the first plurality of modulator cycles.

13. The method of claim 12, wherein, during the second plurality of modulator cycles of the at least one input square wave period, alternately coupling the selected one of the plurality of current sources and the two or more of the plurality of current sources to the first terminal comprises:
    coupling the two or more of the plurality of current sources to the first terminal to produce the second voltage during the first phase and the second phase.

14. A method comprising:
    receiving a time-varying signal at an input of a bipolar device, the time-varying signal including a first current at a first time and a second current at a second time;
    sampling base emitter voltages responsive to the time-varying signal at the input of the bipolar device using a sampling circuit;
    modulating, using a modulator circuit, the base emitter voltages from the sampling circuit to produce a modulator output signal;
    filtering, using a back-end filter having a programmable impulse response, the modulator output signal to produce a filtered output signal, the programmable impulse response having a selectable duration; and
    determining, using a temperature determination circuit, a temperature in response to the filtered output signal.

15. The method of claim 14, further comprising:
    receiving a control signal at a current source circuit having a plurality of current sources; and
    alternately coupling a selected one of the plurality of current sources and two or more of the plurality of current sources to the input of the bipolar device in response to the control signal.

16. The method of claim 14, further comprising:
controlling a current source circuit including a plurality of current sources to:
selectively couple a first current from a first current source of the plurality of current sources to the input of the bipolar device at a first phase of a modulator cycle; and
selectively couple a second current from a second current source of the plurality of current sources to the input of the bipolar device a second phase of the modulator cycle.

17. The method of claim 14, wherein determining, using the temperature determination circuit, the temperature comprises:
determining a measurement period including at least one input square wave period spanning a plurality of modulator cycles; and
determining the temperature during the measurement period.

18. The method of claim 14, further comprising processing values from the filtered output signal using a polynomial machine of the temperature determination circuit to determine the temperature.

19. The method of claim 14, further comprising determining the programmable impulse response using a sine wave.

* * * * *